United States Patent
Mehrvar et al.

(10) Patent No.: US 10,911,845 B1
(45) Date of Patent: Feb. 2, 2021

(54) APPARATUS AND METHOD FOR TUNABLE PHOTONIC DELAY

(71) Applicants: Hamid Mehrvar, Ottawa (CA); Chunshu Zhang, Ottawa (CA)

(72) Inventors: Hamid Mehrvar, Ottawa (CA); Chunshu Zhang, Ottawa (CA)

(73) Assignee: HUAWEI TECHNOLOGIES CO., LTD., Shenzhen (CN)

(*) Notice: Subject to any disclaimer, the term of this patent is extended or adjusted under 35 U.S.C. 154(b) by 0 days.

(21) Appl. No.: 16/508,652

(22) Filed: Jul. 11, 2019

(51) Int. Cl.
| | |
|---|---|
| *H04Q 11/00* | (2006.01) |
| *H04L 29/06* | (2006.01) |
| *H04B 10/67* | (2013.01) |
| *H04B 10/516* | (2013.01) |
| *H04J 14/02* | (2006.01) |

(52) U.S. Cl.
CPC ....... *H04Q 11/0066* (2013.01); *H04B 10/516* (2013.01); *H04B 10/67* (2013.01); *H04J 14/02* (2013.01); *H04L 63/04* (2013.01)

(58) Field of Classification Search
CPC .. H04Q 11/0066; H04B 10/516; H04B 10/67; H04J 14/02; H04L 63/04
See application file for complete search history.

(56) References Cited

U.S. PATENT DOCUMENTS

| | | | | |
|---|---|---|---|---|
| 4,934,777 A | * | 6/1990 | Jou | G02B 6/2861 385/27 |
| 5,125,051 A | * | 6/1992 | Goutzoulis | H01Q 3/2676 385/27 |
| 6,289,151 B1 | * | 9/2001 | Kazarinov | B82Y 20/00 385/24 |
| 6,498,673 B1 | | 12/2002 | Frigo et al. | |
| 6,956,991 B2 | * | 10/2005 | Madsen | G02F 1/00 385/147 |

(Continued)

FOREIGN PATENT DOCUMENTS

| | | |
|---|---|---|
| CN | 106452588 A | 2/2017 |
| CN | 105556985 B | 5/2019 |

(Continued)

OTHER PUBLICATIONS

Linjie Zhou et al "Integrated optical delay lines: a review and perspective"; Chinese Optics Letters; col. 16(10), 101301(2018); Oct. 10, 2018.

(Continued)

*Primary Examiner* — Mina M Shalaby

(57) ABSTRACT

A system and method for a tunable optical delay line. The tunable optical delay line comprises a coarse delay portion that provides a coarse delay amount, the coarse delay portion including a coarse delay selection element in conjunction with a coarse delay element, the coarse delay selection element incorporated on-chip into a photonic integrated circuit (IC) component, the coarse delay element being disposed off-chip of the photonic IC component and interconnected with the coarse delay selection element; and a fine delay element that provides a fine delay amount, the fine delay element interconnected in series with the coarse delay selection element, the optical delay line being tunable to a target delay amount by agglomerating the coarse and fine delay amounts.

28 Claims, 6 Drawing Sheets

(56) References Cited

U.S. PATENT DOCUMENTS

| | | | | |
|---|---|---|---|---|
| 7,283,708 | B2 * | 10/2007 | Efimov | G02B 6/2861 385/39 |
| 7,945,165 | B2 * | 5/2011 | Bernasconi | H04J 14/02 398/102 |
| 8,022,838 | B2 * | 9/2011 | Murphy | G01V 11/002 340/853.3 |
| 8,064,769 | B2 * | 11/2011 | Galli | H04J 14/021 398/83 |
| 8,073,333 | B2 * | 12/2011 | Bernasconi | H04J 14/02 398/102 |
| 8,260,142 | B2 * | 9/2012 | Bernasconi | H04Q 11/0005 398/102 |
| 8,670,675 | B2 * | 3/2014 | Zheng | H04B 10/58 398/159 |
| 2005/0031248 | A1 * | 2/2005 | Kasper | G02B 6/2861 385/15 |
| 2016/0277119 | A1 * | 9/2016 | Sinsky | H04B 10/673 |
| 2017/0230337 | A1 | 8/2017 | Akhavain Mhammadi et al. | |

FOREIGN PATENT DOCUMENTS

| | | |
|---|---|---|
| JP | 2010060717 A | 3/2010 |
| WO | 2019020860 A1 | 1/2019 |

OTHER PUBLICATIONS

Wei Shi et al "Tunable nanophotonic delay lines using linearly chirped contradirectional couplers with uniform Bragg gratings"; Feb. 1, 2014 / vol. 39, No. 3 / Optics Letters.

Xinyi Wang et al "Continuously tunable ultra-thin silicon waveguide optical delay line"; vol. 4, 5 / May 2017/ Optica.

J. Xie, et al, "Seven-bit reconfigurable optical true time delay line based on silicon integration," Opt. Express 22, 25516-25516(2014).

Almaiman, A. et al. Demonstration of a Fine and Coarse Tunable Buffer for Multiple Discrete and Simultaneous Signal Access Using a Frequency Comb, Wavelength Conversion and Chromatic Dispersion, ECOC, Dec. 31, 2015, pp. 1-3.

* cited by examiner

500

Select a coarse delay amount using a coarse delay selection element in conjunction with a coarse delay element, the coarse delay selection element incorporated on-chip into a photonic integrated circuit (IC) component, the coarse delay element being disposed off-chip of the photonic IC component and interconnected with the coarse delay selection element  510

Select a fine delay amount using a fine delay element interconnected in series with the coarse delay element

520

Tune the optical delay line to a target delay amount by agglomerating the coarse and fine delay amounts

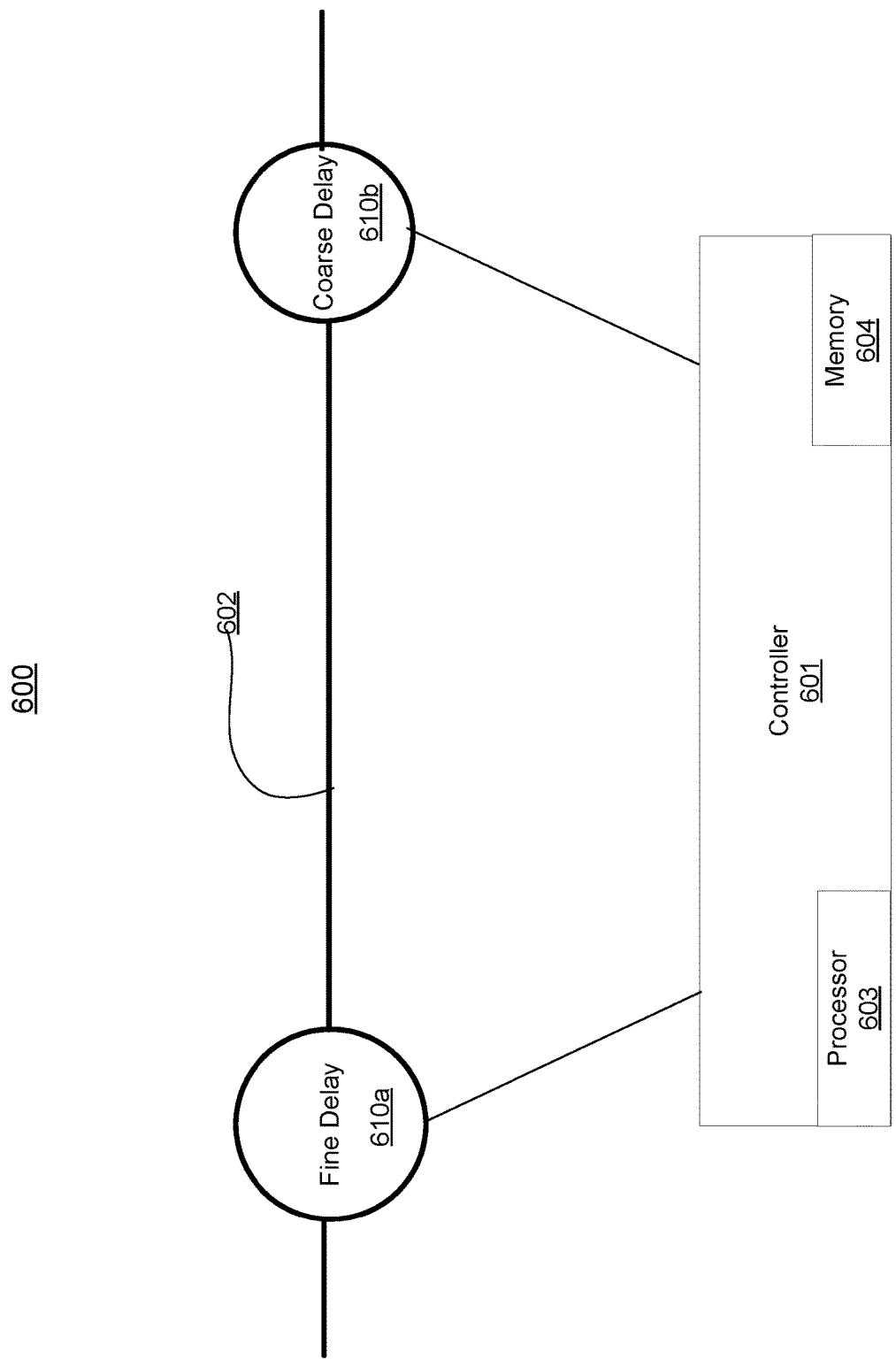

APPARATUS AND METHOD FOR TUNABLE PHOTONIC DELAY

FIELD OF THE INVENTION

The present invention pertains to the field of optical communication systems, and in particular to systems and methods for configuring optical communication systems.

BACKGROUND

As far as development of next generation packet switches based on photonic and optical technology is concerned, optical buffering remains a major challenge in realizing all-optical packet switching.

As light cannot be stopped or directly stored in any media, one approach is that an optical buffer could store optical signals temporally. Optical buffers have multiple applications in photonic switching and signal processing. Over the last 30 years, many researchers have proposed using optical buffers to store data while switching. Optical buffering is rather limited in its capability because an optical equivalent of electronic random access memory remains unavailable. Current optical buffers are built with optical delay lines that delay data packets rather than storing them. Re-circulating loops are typically used to construct optical buffers.

Slow light technology shows promise in optical signal processing, but whether it can be used to build large optical buffers is still unclear. Today there is no optical buffer that can hold a packet of diverse length. Light moves fast, and therefore the optical path length in the buffer is a critical parameter. While there are workarounds to either the address the issue at system level or emulate a very short-term buffer, practical implementation of long term optical buffers has not been achieved.

Today there are no large optical buffers that can hold a packet of diverse length, and neither is there a solution for a meaningful programmable optical delay for applications in buffering and security. Prior art solutions offer a maximum of 1.2 nsec programmable delay while many practical applications require a delay of 10s of nanoseconds, e.g., 0-30 nsec. This invention provides a system and a method of an optical buffer that achieves an optical delay of tens of nanoseconds.

This background information is provided to reveal information believed by the applicant to be of possible relevance to the present invention. No admission is necessarily intended, nor should be construed, that any of the preceding information constitutes prior art against the present invention.

SUMMARY

An object of embodiments of the present invention is to provide techniques that overcome at least some of the foregoing limitations of the prior art.

Accordingly, an aspect of the present invention provides a tunable optical delay line. The tunable optical delay line comprises a coarse delay portion that provides a coarse delay amount, the coarse delay portion including a coarse delay selection element in conjunction with a coarse delay element, the coarse delay selection element incorporated on-chip into a photonic integrated circuit (IC) component, the coarse delay element being disposed off-chip of the photonic IC component and interconnected with the coarse delay selection element; and a fine delay element that provides a fine delay amount, the fine delay element interconnected in series with the coarse delay selection element, the optical delay line being tunable to a target delay amount by agglomerating the coarse and fine delay amounts.

In one aspect, the coarse delay element comprises a set of 1×N and N×1 optical switching elements that are selectable to provide the coarse delay amount.

In another aspect, the coarse delay element comprises a set of miniaturized optical fiber spool components.

In one embodiment, N outputs of the set of 1×N optical switching elements and N inputs of the set of N×1 optical switching elements are interconnected by the set of miniaturized optical fiber spool components.

In yet another embodiment of the tunable optical delay, the N outputs of the set of 1×N optical switching elements and N inputs of the set of N×1 optical switching elements may be based on at least one of a Mach-Zander, a micro-ring and an optical splitter/coupler arrangement that provides a total input/output configuration of 2N+2 elements.

In one variation, the coarse delay amount ranges between 1 nanosecond and 100 nanoseconds.

In another variation, the fine delay amount is less than 1 nanosecond.

In another embodiment of the tunable optical delay line, the fine delay element comprises a waveguide-based fine delay element incorporated in the photonic IC component.

In another embodiment, the coarse and fine delay elements are tunable within a provisional control time to achieve the target delay amount the provisional control time relating to at least one of packet switching, secure obfuscation and an application.

In another broad aspect, a method of tuning an optical delay line to a target delay amount is provided. The method comprises selecting a coarse delay amount provided using a coarse delay selection element incorporated on-chip into a photonic integrated circuit (IC) component in conjunction with a coarse delay element, the coarse delay element being disposed off-chip of the photonic IC component and interconnected with the coarse delay selection element; selecting a fine delay amount using a fine delay element interconnected in series with the coarse delay element; and agglomerating the coarse and fine delay amounts to tune the optical delay line to the target delay amount.

Further provided, in another broad aspect, is an optical network controller. The controller comprises a processor; and a non-transient memory storing instructions executable in the processor to: select a coarse delay amount provided using a coarse delay selection element in conjunction with a coarse delay element, the coarse delay selection element incorporated on-chip into a photonic integrated circuit (IC) component, the coarse delay element being disposed off-chip of the photonic IC component and interconnected with the coarse delay selection element; select a fine delay amount using a fine delay element interconnected in series with the coarse delay element; and tune the optical delay line to a target delay amount by agglomerating the coarse and fine delay amounts.

BRIEF DESCRIPTION OF THE FIGURES

Further features and advantages of the present invention will become apparent from the following detailed description, taken in combination with the appended drawings, in which:

FIG. 5 illustrates, in one example embodiment, a method of configuring an optical delay line;

FIG. 6 illustrates, in an example embodiment, an architecture including a controller configuring an optical delay line.

It will be noted that throughout the appended drawings, like features are identified by like reference numerals.

DETAILED DESCRIPTION

Among other advantages and benefits, the invention herein provides, in comparison with existing approaches:

A higher delay with programmability from 0 to 10's of nanosecond.

Uniform loss for the entire range of delays selectable, as compared with existing approaches that are susceptible to variable loss, by using off-chip coarse delay elements in conjunction with on-chip coarse delay selection elements. The on-chip coarse delay selection element, in an embodiment, is provided by 1×N and N×1 photonic switching elements (or N×1 coupler instead of N×1 switch) while the off-chip coarse delay element may be a plurality of miniaturized fiber spools connected to the periphery regions of the chip interconnecting the 1×N and N×1 switching elements. The output i of 1×N connects to one end of ith fiber spool and the other end of ith fibre spool is connected to the input i of N×1. Both 1×N and N×1 are a single chip and the fibre spool is off-chip.

Tunable delay embodiment applications as discussed below that require up to 30 nsec delay, with coarse granularity of 1 to 10's of nanoseconds, and optional finer granularity of sub-nanosecond.

Optional waveguide-based fine delay that may be added in series to provide further tuning of the optical delay line. The fine delay may a waveguide-based delay that is incorporated on-chip along in a photonic integrated circuit (IC) component with the 1×N and N×1 coarse delay selection elements.

Figure 1A:
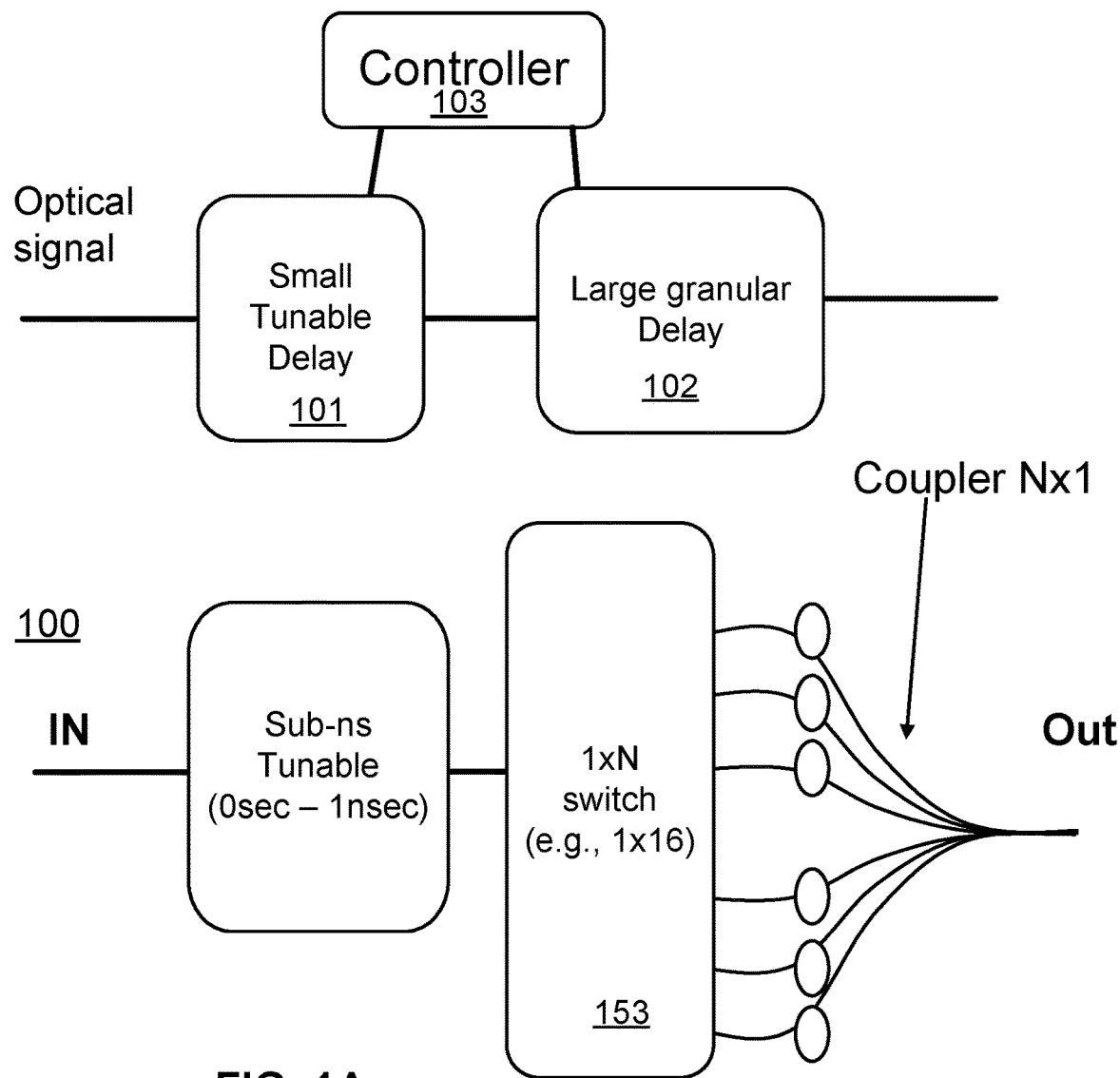
FIG. 1A illustrates, in an example embodiment, design of an optical delay line.

FIG. 1A illustrates, in an example embodiment 100, design of an optical delay line. To increase the delay for optical light and be able to apply to use-case, a hybrid on- and off-chip system with two delay elements, configured in series is proposed. FIG. 1A shows one delay element 101 providing a relatively small delay, referred to herein as a fine delay, of less than 1 nsec. FIG. 1A also shows another delay element 102 providing a larger delay, referred to herein as a coarse delay, having a delay resolution of 1 nsec to 10's of nanoseconds. Fine delay element 101 may have a picosecond resolution in delay adjustment while the coarse delay element 102 is used for large delay in units of nanoseconds, for instance.

A controller 103 that sets both small (fine) and large (coarse) delay to achieve a target delay t is illustrated in FIG. 1A. For an optical buffering use case, the switching is performed in advance (e.g., during the gap between the transmitted packets or during control time) and hence switching time (typically a few ns) is not part of the delay. The invention in one embodiment uses on-chip 1×N and N×1 optical switching elements with off-chip small fiber spool connectivity of the fine and coarse delay elements 101, 102.

In an example embodiment, a target delay of 5.35 nanosecond (nsec) may be configured by the controller by combining 350 picoseconds using the fine delay element 101 with 5 nsec using the coarse element 102. The miniaturized fiber spools comprising the fine delay element are basically the fiber length of the packaged photonic integrated circuit (IC) chip. For N=8 and 0 to 7 nsec delay, fiber spool lengths correspondingly selected are 0 cm, 20 cm, 40 cm, 60 cm, 80 cm, 100 cm, 120 cm, 140 cm in the design embodiment of FIG. 1A using 1×N switch and N×1 coupler.

Figure 1B:
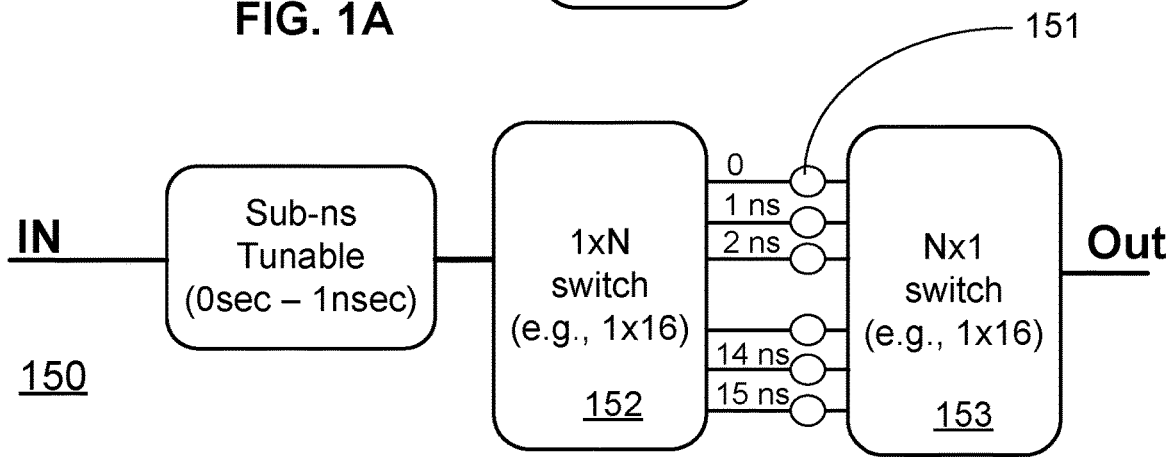
FIG. 1B illustrates another example embodiment of an optical delay line.

FIG. 1B illustrates another example embodiment 150 of an optical delay line. In particular, FIG. 1B shows an alternate design with 1×N and N×1 switching elements with small compactly designed fiber spools 151 connectively interposed in series between the input and output switching elements 152, 153.

As shown in the embodiments of FIGS. 1A and 1B, the coarse delay element includes both 1×N/N×1 and a set of N miniaturized fiber spools interconnecting 1×N and N×1 switching elements. For instance each spool may represent an amount of 2 nanosecond delay and with N=16, the coarse delay is set from 0 nanosecond (for N=1) to 30 nsec (for N=16) in units of 2 nsec. The fine delay element is interconnected in series with 1×N or N×1, may be set to cover a range of 0 to 2 nsec.

Figure 2:
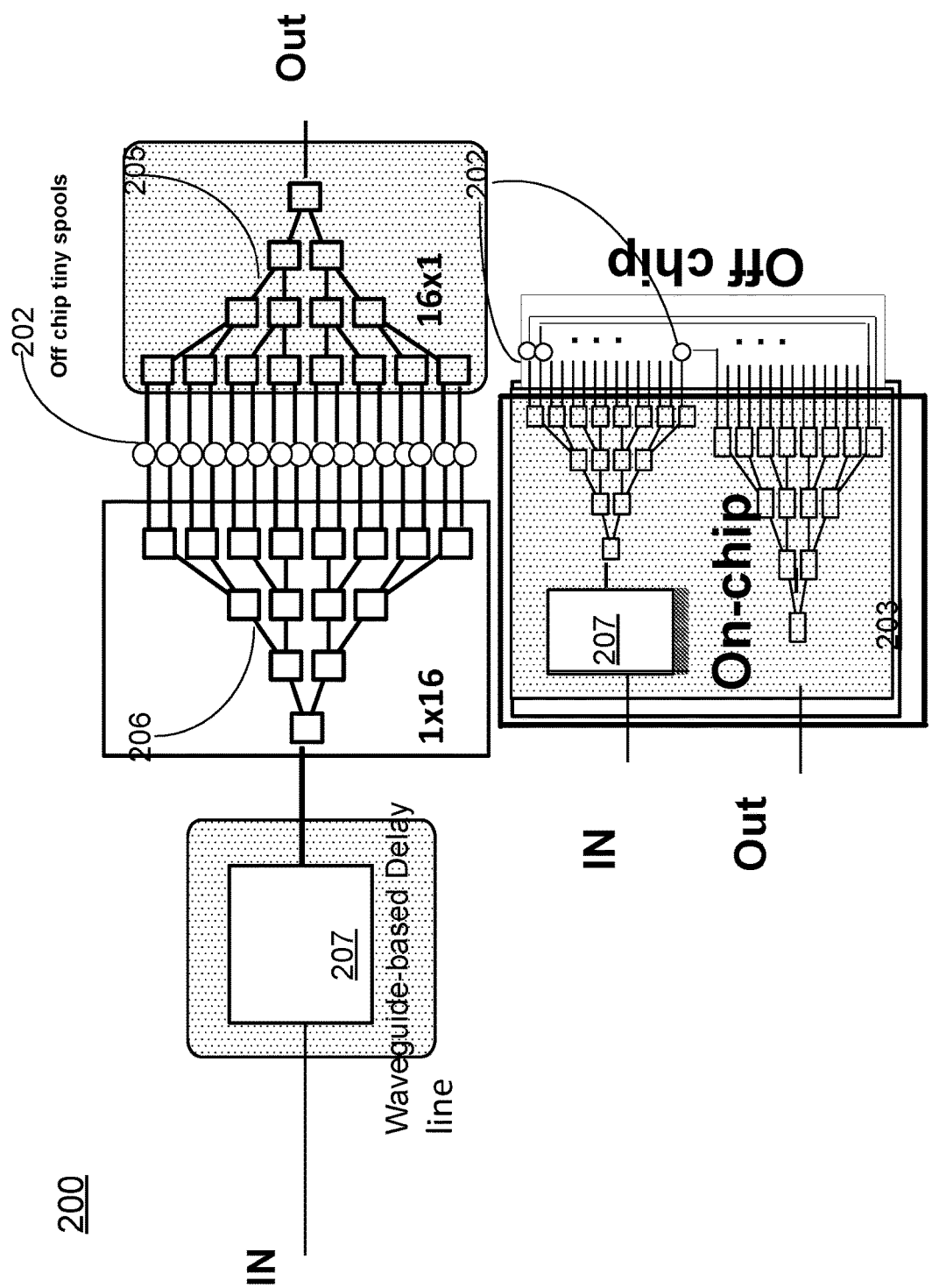
FIG. 2 illustrates, in an example embodiment, an implementation of an optical delay line using silicon photonic switches.

FIG. 2 illustrates, in an example embodiment 200, an implementation of an optical delay line using silicon photonic switches. In particular, FIG. 2 shows an implementation of FIG. 1B using silicon photonic switches. The switching building blocks of 1×2 and 2×1 switching that form 1×N and N×1 switches of coarse delay portion 102 of photonic on-chip IC component 202 may be fast Mach-Zenders (MZI) switches designed in silicon photonics with carrier injection. Miniature fiber spool components 202 are disposed off-chip from photonic on-chip IC component 202 and connected in series with the N outputs of 1×N and the N inputs, depicted at items 205, 206 respectively of FIG. 2, of the N×1 switches of coarse delay portion 102. An optional waveguide-based fine delay element 207 may be connected in series with the coarse delay element 102, providing additional tuning capability. In one embodiment, optional waveguide-based fine delay element 207 may be incorporated in the photonic IC component 202 that includes the coarse delay element 102.

In yet another embodiment of the tunable optical delay, the N outputs of the set of 1×N optical switching elements and N inputs of the set of N×1 optical switching elements may be based on any one of a Mach-Zander, a micro-ring and an optical splitter/coupler arrangement that provides a total input/output configuration of 2N+2 elements.

Figure 3:
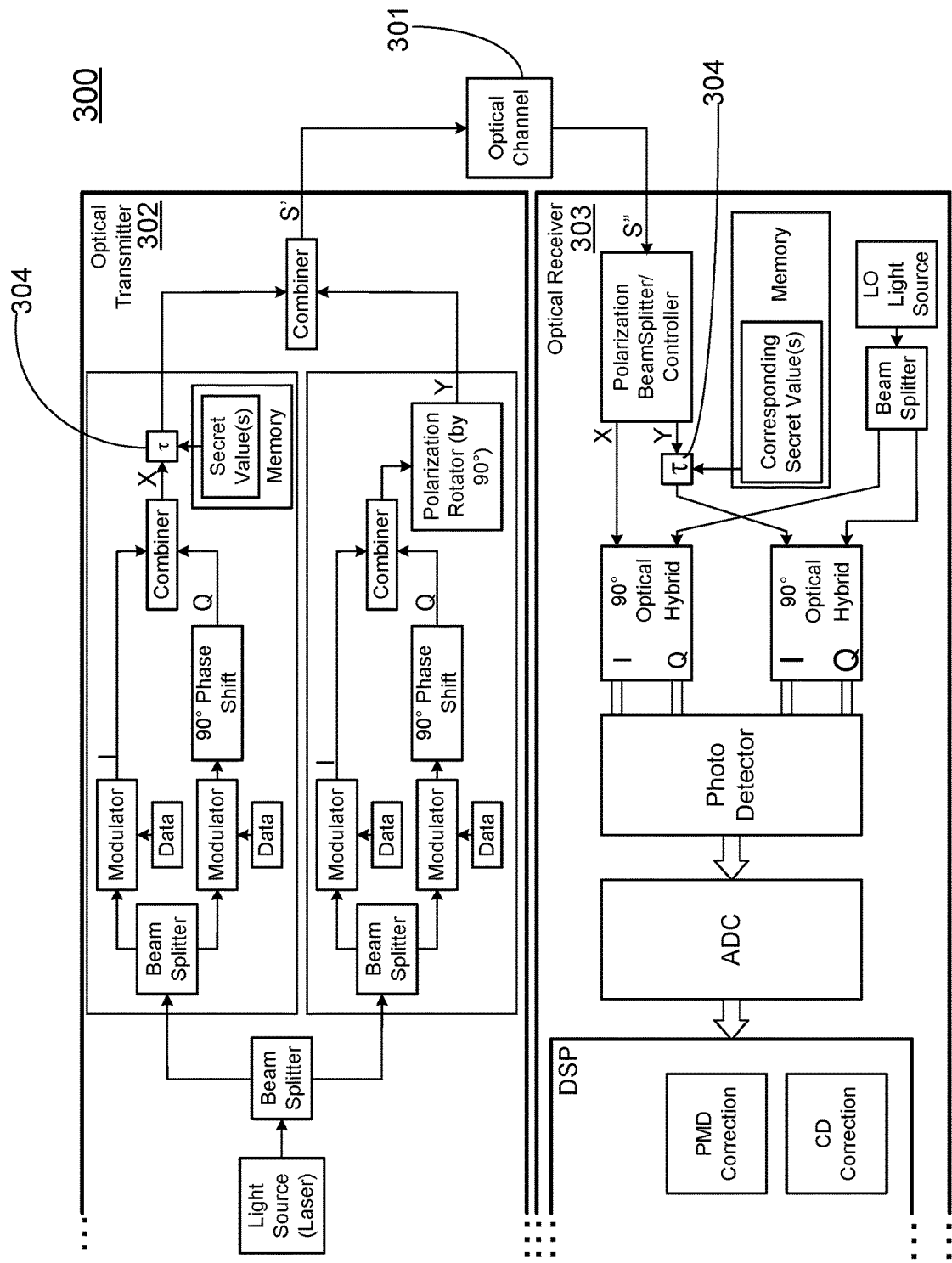
FIG. 3 illustrates an example embodiment application of the optical delay line in optical signal obfuscation of polarization multiplexed signals.

FIG. 3 illustrates an example embodiment application 300 of the optical delay line in optical signal obfuscation of polarization multiplexed signals. In particular, the use case illustrated in FIG. 3 requires 1 to 30 nsec delay, with coarse granularity of 1 nsec, and optionally a sub-nanosecond granularity. The particular application embodiment depicted in FIG. 3 illustrates an application of the invention for delay setting used to obfuscate an optical signal of a polarization multiplexed signals in an optical channel 301 that includes optical transmitter 302 and optical receiver 303. The embodiment depicted may implement a time variable delay 304 in the secure obfuscation of an optical signal on one polarization at optical transmitter 301 and compensates on the opposite polarization by delaying it at optical receiver 303, hence both polarizations have the same delay. It is apparent that an interloper who taps the signals would not know about the existence of the delay, the process for selecting the delay, nor the amount of delay needed to recover an attendant optical signal that is obfuscated.

The target delay amount t as selected should be much larger that correction capability of the digital signal processor (DSP), typically implemented to date at around 100 ps. The delay should be set randomly to a value from 1 nanosecond to 10's of nanoseconds during a random duration of time and changed to another value. The time of change may be random but synchronized and the value of change may be random as well.

Figure 4:
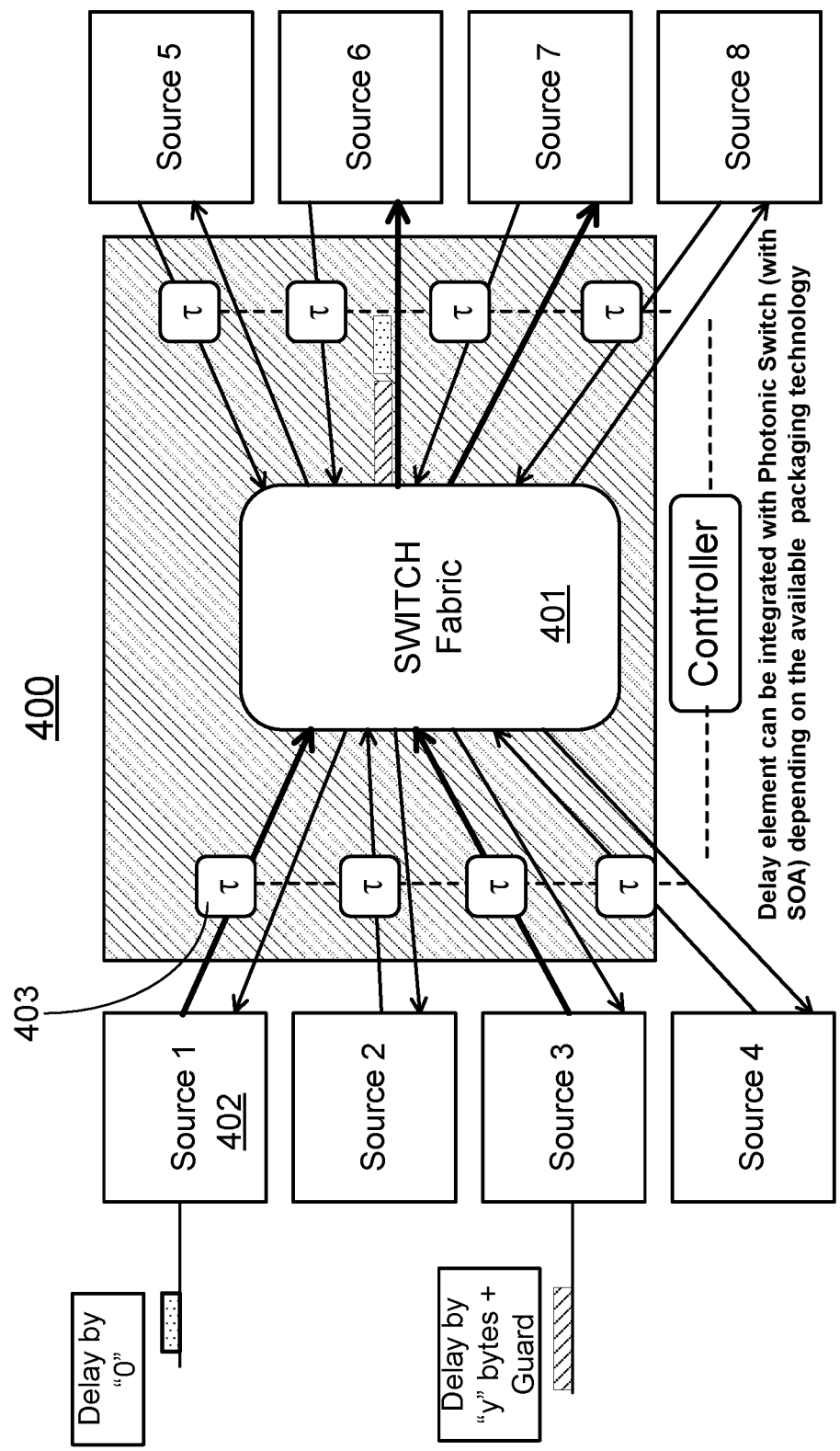
FIG. 4 illustrates an example embodiment application of the optical delay line in optical packet buffering.

FIG. 4 illustrates an example embodiment application 400 of the optical delay line in optical packet buffering. In particular, the use case illustrated in FIG. 4 requires 1 to 30 nsec delay, with coarse granularity of 1 nsec, and optionally a sub-nanosecond granularity. The application depicted in FIG. 4 shows the invention as may be applied in optical packet buffering. When an input source 402 attempts to send a packet to an output it may not be able to do so as the output may be in the process of receiving packet(s) from another input. As a result of such contention, an input can delay the transmission. Since the packet size varies from 64 bytes to 1518 bytes, the amount of delay t 403 depends on the line rate. In an embodiment of packet size between 64B and 1500B, the delay amount t 403 may be in the range of 1.2 nsec to 30 nsec, employing coarse tuning of 1 nsec and N=32. In this example, fine granularity is optional as coarse delay may be sufficient for similar practical applications. The delay amount 403 may be set at the input to the switch fabric 401.

FIG. 5 illustrates, in one example embodiment, a method 500 of configuring an optical delay line.

At step 510, select a coarse delay amount provided using a coarse delay selection element in conjunction with a coarse delay element, the coarse delay selection element incorporated on-chip into a photonic integrated circuit (IC) component, the coarse delay element being disposed off-chip of the photonic IC component and interconnected with the coarse delay selection element.

At step 520, select a fine delay amount using a fine delay element interconnected in series with the coarse delay selection element.

At step 530, tune the optical delay line to a target delay amount by agglomerating the coarse and fine delay amounts.

FIG. 6 illustrates, in an example embodiment, an architecture 600 including a controller 601 configuring fine delay element 610a and coarse delay element 610b in a transport path of optical signal 602. The controller 601 may include a processor 603 and a non-transient memory 604 storing instructions that are executable in processor 603.

In an embodiment, the non-transient memory 604 stores instructions executable in the processor 603 to select a coarse delay amount provided using a coarse delay element incorporated on-chip into a photonic integrated circuit (IC) component, select a fine delay amount using a fine delay element disposed independently of the photonic IC component and interconnected in series with the coarse delay element, and tune the optical delay line to a target delay amount by agglomerating the coarse and fine delay amounts.

In one embodiment, the controller 601 may comprise a software defined network (SDN) controller that implements a network monitoring and management software layer. The functionality of the controller 801 may also partially or fully reside on nodes associated with the optical section of the optical communication network.

Although the present invention has been described with reference to specific features and embodiments thereof, it is evident that various modifications and combinations can be made thereto without departing from the invention. The specification and drawings are, accordingly, to be regarded simply as an illustration of the invention as defined by the appended claims, and are contemplated to cover any and all modifications, variations, combinations or equivalents that fall within the scope of the present invention.

We claim:

1. A tunable optical delay line comprising:
a coarse delay portion that provides a coarse delay amount, the coarse delay portion including a coarse delay selection element in conjunction with a coarse delay element, the coarse delay selection element incorporated on-chip into a photonic integrated circuit (IC) component and comprising a plurality of optical switching elements that are selectable to provide the coarse delay amount, said optical switching elements having a switching time on the order of nanoseconds, the coarse delay element being disposed off-chip of the photonic IC component and interconnected with the coarse delay selection element, the coarse delay element having an inter-delay spacing granularity of at least 1 nanosecond and being configurable between a minimum value and a maximum value, the minimum value being a delay amount capable of optically buffering a packet of minimum size and the maximum value being a delay amount capable of optically buffering a packet of maximum size, wherein said optical buffering comprises storing, in the tunable optical delay line, an optical signal conveying an entirety of the packet; and
a fine delay element that provides a fine delay amount, the fine delay element interconnected in series with the coarse delay selection element;
wherein the optical delay line is tunable to a target delay amount by agglomerating the coarse and fine delay amounts.

2. The tunable optical delay line of claim 1 wherein the coarse delay selection element comprises a set of 1×N and N×1 optical switching elements that are selectable to provide the coarse delay amount.

3. The tunable optical delay line of claim 2 wherein the coarse delay element comprises a set of miniaturized optical fiber spool components.

4. The tunable optical delay line of claim 3 wherein N outputs of the set of 1×N optical switching elements and N inputs of the set of N×1 optical switching elements are interconnected by the set of miniaturized optical fiber spool components.

5. The tunable optical delay of claim 4 wherein the N outputs of the set of 1×N optical switching elements and N inputs of the set of N×1 optical switching elements are based on at least one of a Mach-Zehnder, a micro-ring and an optical splitter/coupler arrangement that provides a total input/output configuration of 2N+2 elements.

6. The tunable optical delay line of claim 3 wherein the coarse delay amount ranges between 1 nanosecond and 100 nanoseconds.

7. The tunable optical delay line of claim 3 wherein the fine delay amount is less than 1 nanosecond.

8. The tunable optical delay line of claim 1 wherein the fine delay element comprises a waveguide-based fine delay element incorporated in the photonic IC component.

9. The tunable optical delay line of claim 1 wherein the coarse and fine delay elements are tunable within a provisional control time to achieve the target delay amount, the provisional control time relating to at least one of packet switching, secure obfuscation and an application.

10. A method of tuning an optical delay line to a target delay amount, the method comprising:
   selecting a coarse delay amount provided using a coarse delay selection element incorporated on-chip into a photonic integrated circuit (IC) component in conjunction with a coarse delay element, the coarse delay element being disposed off-chip of the photonic IC component and interconnected with the coarse delay selection element, the coarse delay element having a granularity of at least 1 nanosecond and being configurable between a minimum value and a maximum value, the minimum value being a delay amount capable of optically buffering a packet of minimum size and the maximum value being a delay amount capable of optically buffering a packet of maximum size, wherein said optical buffering comprises storing, in the tunable optical delay line, an optical signal conveying an entirety of the packet, and wherein the coarse delay selection element comprises a plurality of optical switching elements that are selectable to provide the coarse delay amount, said optical switching elements having a switching time on the order of nanoseconds;
   selecting a fine delay amount using a fine delay element interconnected in series with the coarse delay element; and
   agglomerating the coarse and fine delay amounts to tune the optical delay line to the target delay amount.

11. The method of claim 10 wherein the coarse delay selection element comprises a set of 1×N and N×1 optical switching elements that are selectable to provide the coarse delay amount.

12. The method of claim 11 wherein the coarse delay element comprises a set of miniaturized optical fiber spool components.

13. The method of claim 12 wherein N outputs of the set of 1×N optical switching elements and N inputs of the set of N×1 optical switching elements are interconnected by the set of miniaturized optical fiber spool components.

14. The method of claim 12 wherein the coarse delay amount ranges between 1 nanosecond and 100 nanoseconds.

15. The method of claim 12 wherein the fine delay amount is less than 1 nanosecond.

16. The method of claim 11 wherein the fine delay element comprises a waveguide-based fine delay element incorporated in the photonic IC component.

17. The method of claim 12 wherein the coarse and fine delay elements are tunable within a provisional control time to achieve the target delay amount, the provisional control time relating to at least one of packet switching, secure obfuscation and an application.

18. An optical network controller comprising:
   a processor; and
   a non-transient memory storing instructions executable in the processor to:
      select a coarse delay amount provided using a coarse delay selection element in conjunction with a coarse delay element, the coarse delay selection element incorporated on-chip into a photonic integrated circuit (IC) component, the coarse delay element being disposed off-chip of the photonic IC component and interconnected with the coarse delay selection element, the coarse delay element having a granularity of at least 1 nanosecond and being configurable between a minimum value and a maximum value, the minimum value being a delay amount capable of optically buffering a packet of minimum size and the maximum value being a delay amount capable of optically buffering a packet of maximum size, wherein said optical buffering comprises storing, in the tunable optical delay line, an optical signal conveying an entirety of the packet, and wherein the coarse delay selection element comprises a plurality of optical switching elements that are selectable to provide the coarse delay amount, said optical switching elements having a switching time on the order of nanoseconds;
      select a fine delay amount using a fine delay element interconnected in series with the coarse delay element; and
      tune the optical delay line to a target delay amount by agglomerating the coarse and fine delay amounts.

19. The optical network controller of claim 18 wherein the coarse delay selection element comprises a set of 1×N and N×1 optical switching elements that are selectable to provide the coarse delay amount.

20. The optical network controller of claim 19 wherein the coarse delay element comprises a set of miniaturized optical fiber spool components.

21. The optical network controller of claim 20 wherein N outputs of the set of 1×N optical switching elements and N inputs of the set of N×1 optical switching elements are interconnected by the set of miniaturized optical fiber spool components.

22. The optical network controller of claim 18 wherein the coarse delay amount ranges between 1 nanosecond and 100 nanoseconds.

23. The optical network controller of claim 18 wherein the fine delay amount comprises less than 1 nanosecond.

24. The optical network controller of claim 18 wherein the fine delay element comprises a waveguide-based fine delay element incorporated in the photonic IC component.

25. The optical network controller of claim 18 wherein the coarse and fine delay elements are tunable a provisional control time to achieve the target delay amount, the provisional control time relating to at least one of packet switching, secure obfuscation and an application.

26. The tunable optical delay line of claim 1, wherein the coarse delay element comprises a set of miniaturized optical fiber spool components, and wherein at least one of the optical fiber spool components is a spiral-wound component with multiple windings of an optical fiber having a length that causes the coarse delay amount to range between 1 nanosecond and 100 nanoseconds.

27. The tunable optical delay line of claim 1, wherein the coarse delay element comprises a set of miniaturized optical fiber spool components, and wherein transmission along at least one of the optical fiber spool components occurs in only one direction of the fiber.

28. The tunable optical delay line of claim 4, wherein transmission along at least one of the optical fiber spool components occurs in only one direction of the fiber, said transmission being from one of the set of 1×N optical switching elements toward one of the set of N×1 optical switching elements, the set of 1×N optical switching elements being different from the set of N×1 optical switching elements.

* * * * *

UNITED STATES PATENT AND TRADEMARK OFFICE
CERTIFICATE OF CORRECTION

PATENT NO. : 10,911,845 B1
APPLICATION NO. : 16/508652
DATED : February 2, 2021
INVENTOR(S) : Mehrvar et al.

It is certified that error appears in the above-identified patent and that said Letters Patent is hereby corrected as shown below:

In the Claims

Column 8, Line 41, "coarse and fine delay elements are tunable a provisional" should read --coarse and fine delay elements are tunable within a provisional--

Signed and Sealed this
Thirtieth Day of March, 2021

Drew Hirshfeld
*Performing the Functions and Duties of the*
*Under Secretary of Commerce for Intellectual Property and*
*Director of the United States Patent and Trademark Office*